INVENTORS
KLAUS K. STANGE
ADALBERT A. LUX
THOMAS B. MICHAELS
BY
ATTORNEYS

Sept. 30, 1969  K. K. STANGE ET AL  3,469,834
SHEET FEEDER AND SEPARATOR APPARATUS
Filed April 21, 1967  8 Sheets-Sheet 5

INVENTORS
KLAUS K. STANGE
ADALBERT A. LUX
BY THOMAS B. MICHAELS

ATTORNEYS

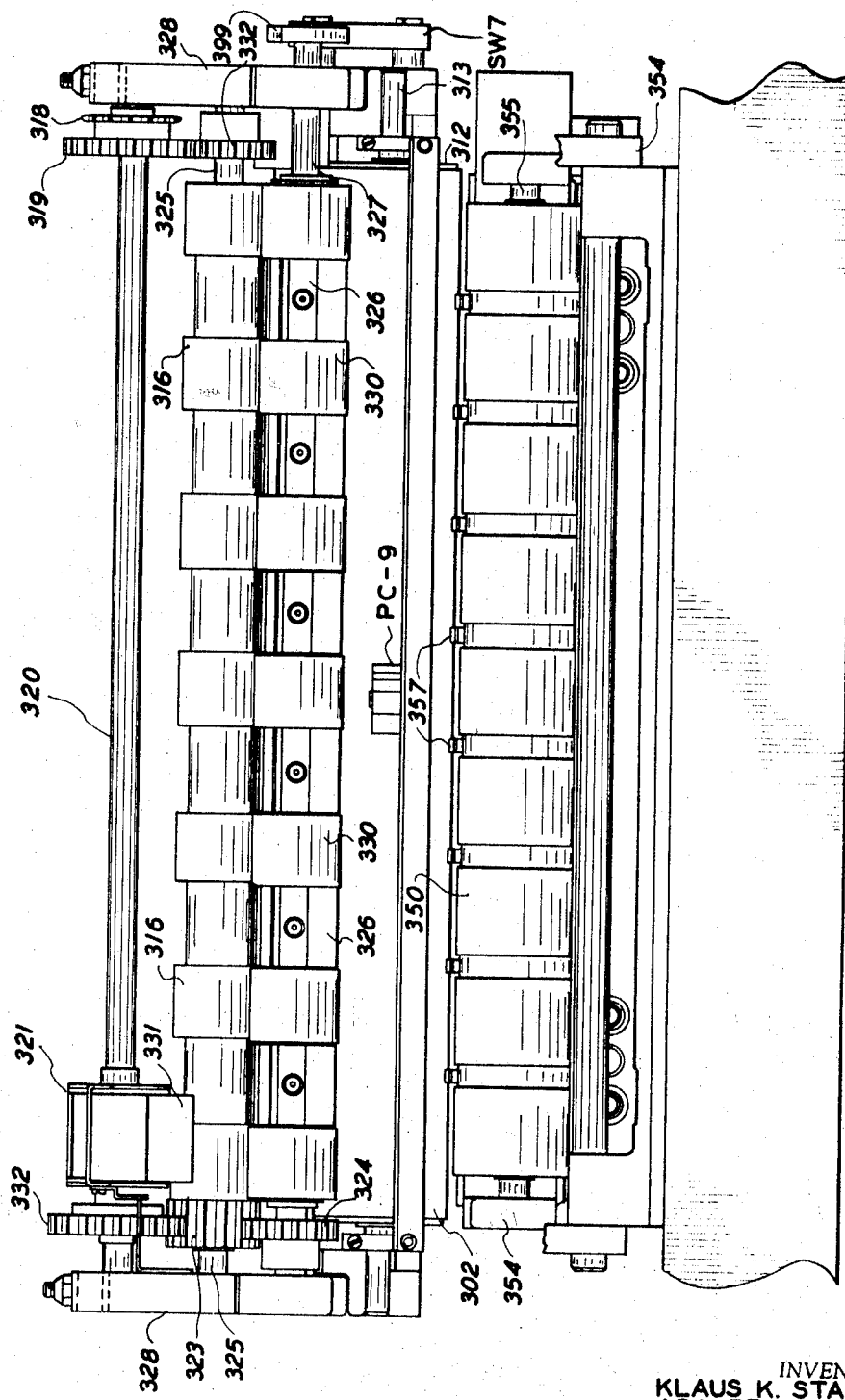

INVENTORS
KLAUS K. STANGE
ADALBERT A. LUX
THOMAS B. MICHAELS
BY
ATTORNEYS

United States Patent Office 3,469,834
Patented Sept. 30, 1969

3,469,834
SHEET FEEDER AND SEPARATOR APPARATUS
Klaus K. Stange, Pittsford, Adalbert A. Lux, Penfield, and Thomas B. Michaels, Rochester, N.Y., assignors to Xerox Corporation, Rochester, N.Y., a corporation of New York
Filed Apr. 21, 1967, Ser. No. 632,793
Int. Cl. B65h 5/16, 5/06
U.S. Cl. 271—10        21 Claims

ABSTRACT OF THE DISCLOSURE

Apparatus for automatically and manually feeding documents to a xerographic machine in which a stack of sheets to be serially advanced are adjustably supported in contact with a friction drive wheel engaging the uppermost sheet in the stack. The sheets are advanced thereby into the wrap formed between a stationary retarding roll or abutment member which is in substantial contact with the moving surface of a belt member. Adhering overlapping sheets are separated by the abutment member as they are advanced through the wrap. The uppermost sheet in the wrap is advanced by the belt to engage a sheet interrupter before being released to a pair of continuously rotating friction rolls which deliver the sheet to the moving transport of the xerographic machine. Apparatus is also provided for inhibiting release of the sheet interrupter and an engaged sheet, in the event that a malfunction in the feeder-separator apparatus occurs. For manual feeding operations the abutment member is positioned out of contact with the belt and a sheet inserted to contact the interrupter forming a hump or buckle therein. Thereafter, the sheet is released to contact the continuously rotating friction rolls for delivery to the moving transport of the xerographic machine.

Background of the invention

This invention relates generally to sheet feeding and separating apparatus and more particularly to apparatus for serially feeding documents from the top portion of a stack to a xerographic machine.

The development of high speed xerographic machines has brought about the need for a simple yet reliable document feeder and separator apparatus capable of handling documents varying in length, width, thickness, weight, and surface conditions. In order to serve in a wide variety of applications these same machines require that the feeder and separator apparatus operate efficiently and reliably both as an automatic feed on the one hand and as a manual input feeder on the other hand.

For example, in automatic machines of the type disclosed in copending application Ser. No. 632,662 filed concurrently herewith in the names of G. P. Taillie, J. F. Gardner, T. B. Michaels and D. W. Gouldsmith wherein xerographic images are formed in reduced configuration on electrical accounting machine cards, it is desirable to image documents fed both automatically from the top of a stack into the machine and also documents fed manually into the machine.

In the particular machine referred to above, the document is transported into the optical path by a document conveyor or transport apparatus which is disclosed in copending application Ser. No. 632, 801 now Patent No. 3,419,264 filed concurrently herewith in the names of J. F. Gardner, M. H. Lustig and A. A. Lux. In order to obtain uniform high quality images on the card stock it is necessary that the imaged document be accurately positioned in the optical path during exposure. This dictates that the document be accurately and reliably deposited on the conveyor, correctly aligned, in proper sequence with the machine operation regardless of whether the automatic or manual feeding mode is utilized.

When functioning in the automatic mode it is extremely important that not more than a single document be fed to the conveyor for imaging at a time. In the event that more than a single document is deposited on the transport, the resultant image obtained therefrom may be a double exposure due to the translucent properties of some paper stocks or may not be properly positioned on the record media. In addition, jams in the paper path can result with a consequent loss of time in dismantling the machine and removing the difficulty.

Various attempts have been made in prior feeding and separating devices to insure the feeding of only a single document. Many of these devices require precise settings between friction members in order to obtain effective separation. These devices also require frequent adjustments of the friction members as wear occurs. In addition, many of these devices have also proven ineffective for operating on a wide range of thicknesses and types of paper stock.

Attempts to provide apparatus capable of handling all types of paper material have achieved somewhat unsatisfactory results. For example, apparatus which has proven satisfactory for the thicker types of paper stock do not work particularly well with the thinner varieties. On the other hand these devices which can successfully handle the thin types of paper stock are not effective for the thicker varieties.

Summary of the invention

Accordingly, it is an object of the invention to feed single sheets of paper stock from a stack to the transport system of a xerographic machine.

It is a further object of the invention to provide apparatus for feeding and separating paper stock of various lengths, widths, thicknesses, weight and surface conditions.

It is a further object of the invention to provide apparatus for feeding documents to a xerographic machine in accurate alignment with the transport system.

It is a further object of the invention to provide apparatus for feeding and effectively separating documents from an overlapped relationship and for singularly delivering the documents in succession without damaging the documents.

It is a further object of the invention to provide sheet feeding and separating apparatus which is quiet in operation.

It is a further object of the invention to provide apparatus for inhibiting delivery of documents to a xerographic machine in the event that a malfunction occurs in the feeding and separating apparatus.

It is a further object of the invention to provide an automatic feeding and separating apparatus which is also adapted for manual feeding operations.

It is a further object of the invention to provide apparatus for automatically and adjustably supporting a stack of documents to contact the feeding apparatus.

These and other objects of the invention are attained by means of an abutment member or stationary retarding roller in substantial contact with the moving surface of an advancing belt member forming an extended area of contact or wrap of the belt material about the periphery of the abutment member. A document supporting means adjustably supports a stack of sheets with the uppermost sheet of the stack in contact with a friction drive means. The friction drive means advances sheets into the wrap where adhering overlapping sheets are separated by the abutment member as they are advanced through the wrap. The uppermost sheet is advanced by the belt to a sheet interrupting means which engages the leading edge thereof forming a hump or buckle in the advanced sheet. A pair of continuously rotating friction roll members engage the sheet upon release of the interrupting means to deliver the sheet for processing.

Other objects of the invention will become readily apparent to those skilled in the art in view of the following detailed disclosure and description thereof, especially when read in conjunction with the accompanying drawings.

Brief description of the drawings

FIGURE 9 is an elevational view of the sheet interrupter and feed roll arrangement taken in the direction as shown in FIGURE 3.

Description of the preferred embodiments

Figure 1:
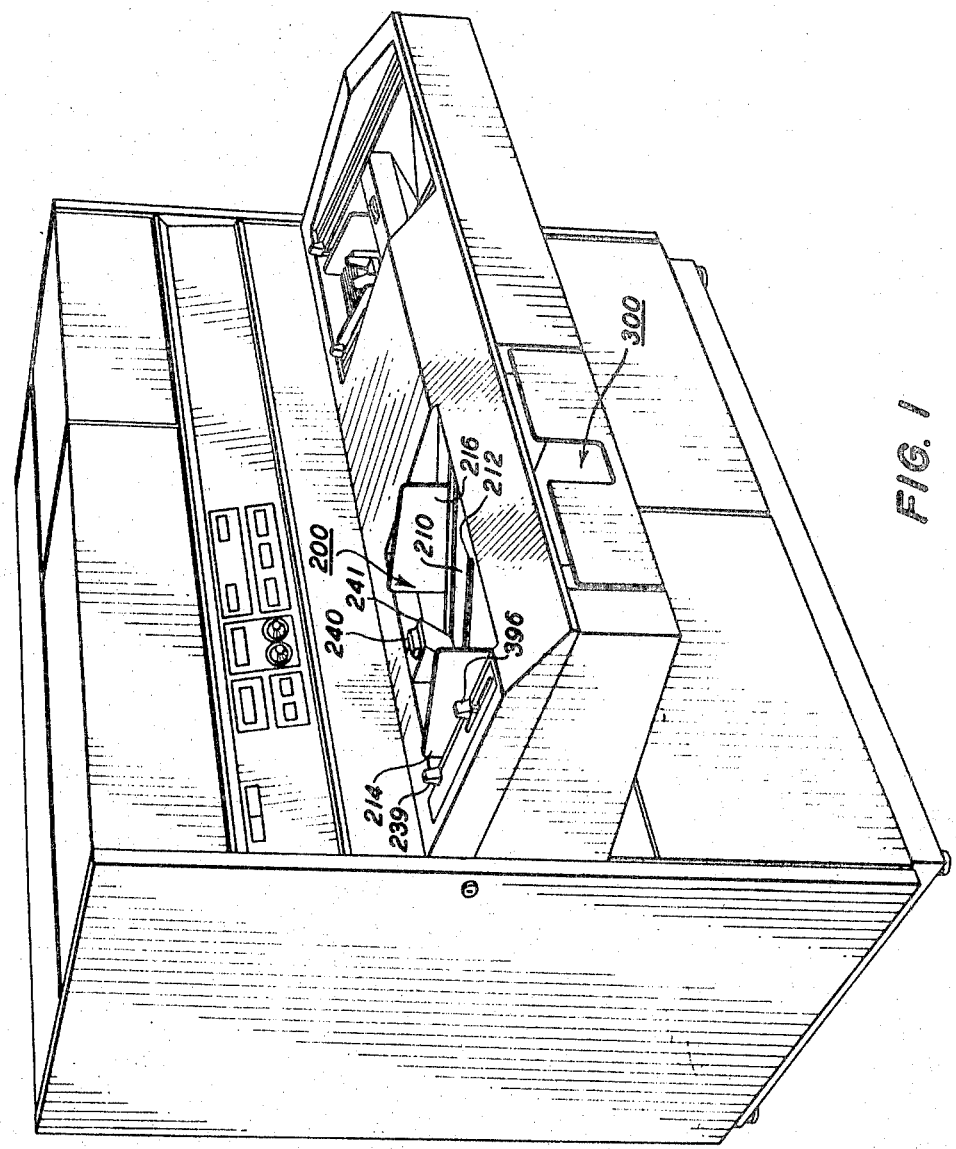
FIGURE 1 is an exterior view of the xerographic machine in which the feeding and separating apparatus is particularly adapted for use.

A preferred embodiment of the feeding and separating apparatus is particularly adapted for use in a xerographic machine of the type illustrated in FIG. 1. As shown therein, the feeder separator apparatus is mounted in a desk console external to the main xerographic portion of the machine. A document return conveyor and stacking apparatus which does not form a part of the instant invention is also mounted within the desk console arrangement below the feeding and separating apparatus. As can be seen from FIG. 1 and as will hereinafter become readily apparent, documents to be processed by the machine are placed in the feeder-separator apparatus generally designated 200 and are fed individually into the machine for processing. After processing these documents are returned to the operator by the return conveyor and stacking apparatus generally designated 300.

Figure 2:
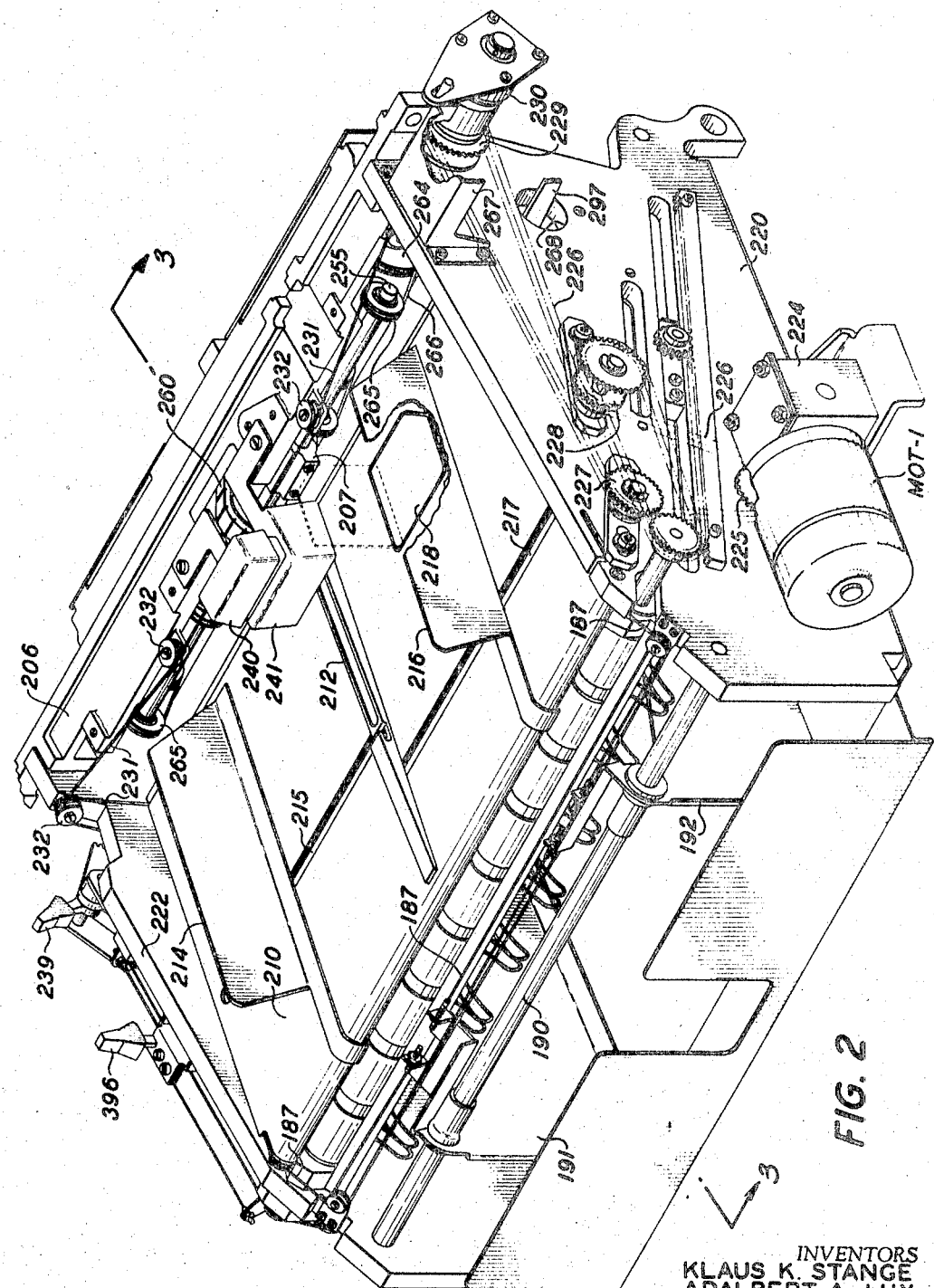
FIGURE 2 is a perspective view of the document feeding and separating apparatus.
Figure 4:
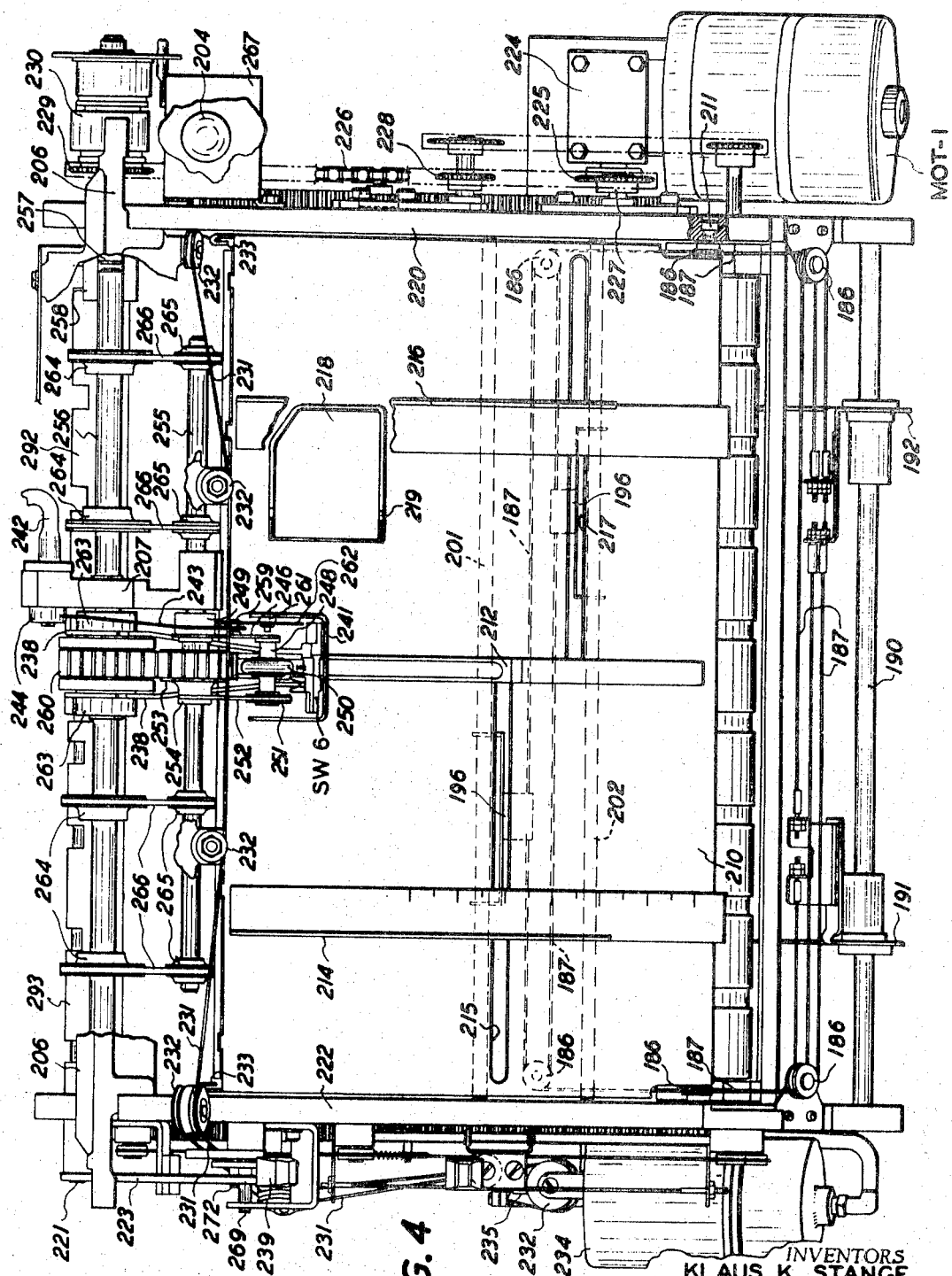
FIGURE 4 is a partly broken away plan view showing the document feeding and separating apparatus.

Referring now especially to FIGS. 2 and 4, the feeder separator apparatus is mounted between a pair of side frame plates 220 and 222 as is also the document return conveyor and stacker apparatus. A cross frame casting 206 is connected between side frame plates 220 and 222 via bolts or other suitable fastening means. The feeder-separator apparatus and document return-conveyor and stacker apparatus are then attached to the frame assembly of the main xerographic portion of the machine via side frame plates 220 and 222 and cross frame casting 206.

A document support tray 210 is pivotally mounted between side frame plates 220 and 222 via pivot shaft 211. A document support member 212 projects above the surface of the document support tray 210 and extends longitudinally in the direction of feed into the feeder-separator area. Documents placed on document support tray 210 extend over support member 212 in draped or arched configuration which has the effect of substantially reducing the tendency of adjacent sheets in the stack to adhere together.

A switch SW-4 which is utilized in manual feeding operations is located beneath document support tray 210. A double L-shaped actuator rod 197 extends from switch SW-4 through openings in document support tray 210 and document support member 212 and is adapted to be contacted by the trailing edge of a manually fed document or document carrier. Actuator rod 197 is normally biased into engagement with switch SW-4 by a spring 195.

A pair of upstanding paper guide plates 214 and 216 are mounted for transverse positioning through slots 215 and 217 respectively in document support tray 210 via mounting brackets 196 on shafts 201 and 202. Paper guide plates 214 and 216 are interconnected by a cable arrangement to paper guide plates 191 and 192 of the document return conveyor and stacker apparatus by cable 187. As may be seen from FIGS. 2 to 4, the cable 187 passes from the mounting bracket 196 of paper guide plate 216 over a dual pulley 186 at the end of paper guide slot 217 and is connected to the mounting bracket 196 of paper guide plate 214. The cable 187 passes from the mounting bracket 196 of paper guide plate 214 over a second dual pulley 186 positioned at the end of paper guide slot 215 and is connected to the mounting bracket 196 of paper guide plate 216.

Paper guide plates 191 and 192 of the document return conveyor and stacker apparatus are slideably mounted on a single shaft 190. The cable 187 passes from the mounting bracket of guide plate 192 over a dual pulley 186 connected to side frame plate 220 and is connected to the mounting bracket of guide plate 191. The cable 187 passes from the mounting bracket of guide plate 191 over a dual pulley 186 connected to side frame plate 222 and is connected to the mounting bracket of guide plate 192.

The two sets of paper guide plates, 214 and 216, and 191 and 192, are then interconnected by cable 187 connected to the mounting bracket 196 of guide plate 214, passing over dual pulley 186 at the end of paper guide slot 217, over single pulley 186 on pivot shaft 211, over dual pulley 186 connected to side frame plate 220 and is connected to the mounting bracket of guide plate 192. The cable 187 passes from the mounting bracket of guide plate 192 over dual pulley 186 connected to side frame plate 222, over single pulley 186 on pivot shaft 211, over dual pulley 186 at the end of paper guide slot 215 and is connected to the mounting bracket 196 of guide plate 214. This arrangement provides in effect a continuous cable arrangement between the interconnected parts whereby lateral displacement of any one of the paper guide plates effects a corresponding completary displacement of the remainder independent of the position of document support tray 210. Thus, positioning of the paper guide plates 214 and 216, of the feeder-separator apparatus likewise effects a corresponding positioning of the paper guide plates 191 and 192 of the return conveyor and stacking apparatus.

An additional guide plate 218, is pivotally movable from a first position coextensive with the upper surface of document support tray 210 to a second upstanding position via pivot shaft 219. Guide plate 218 is utilized in conjunction with certain types of special purpose cards and documents wherein it is desirable that the input documents assume an alignment not obtainable with guide plates 214 and 216.

Figure 5:
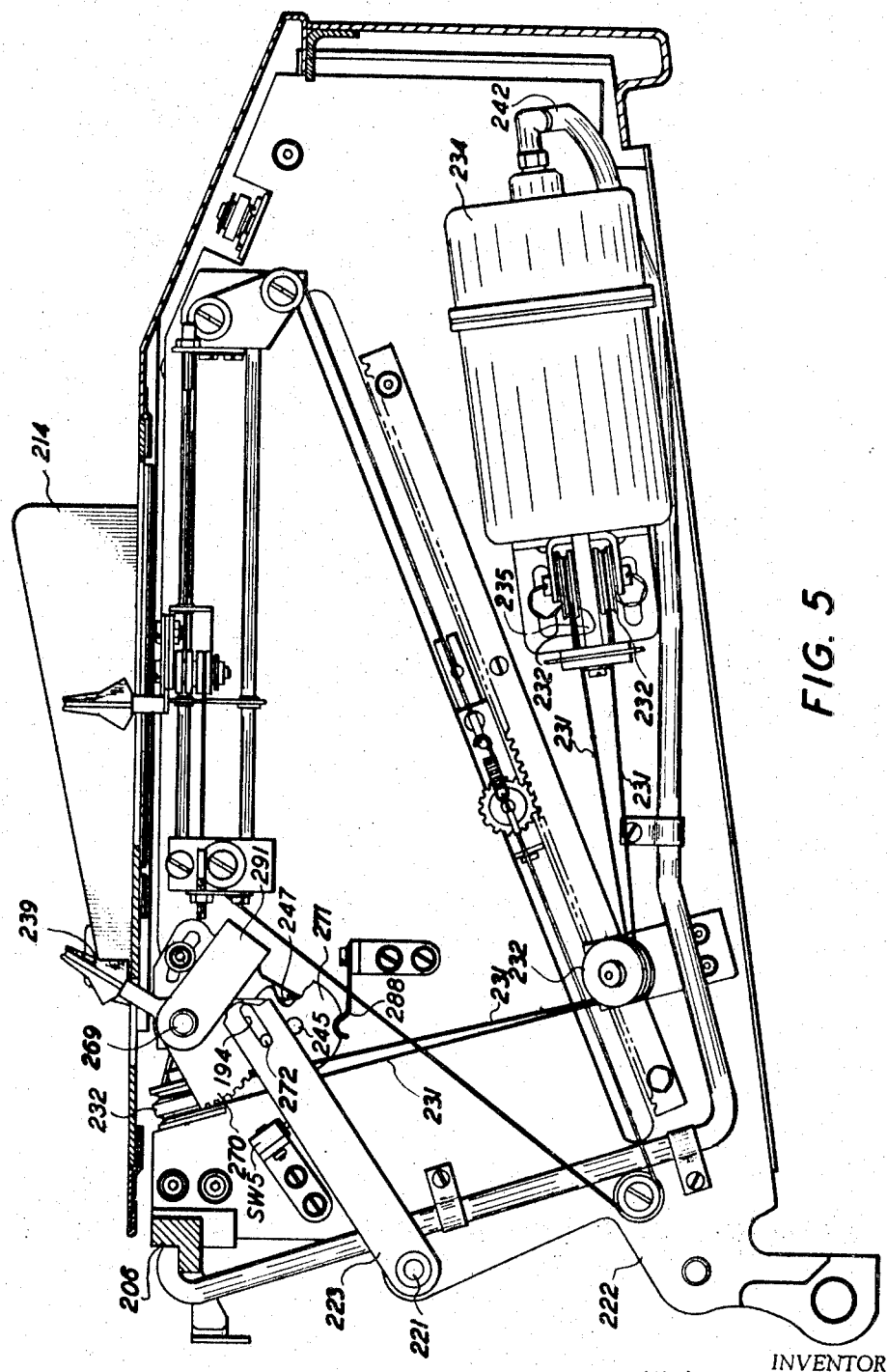
FIGURE 5 is a left hand side elevation, as viewed from FIGURE 4, of the document feeding and separating apparatus.

As best seen in FIGS. 4 and 5, an air motor 234 is connected to side frame plate 222 for adjustably positioning document support tray 210. Air motor 234 is of a type generally well known in which a piston therein is connected to piston rod 235 and is normally biased to the position illustrated in FIG. 5. An air supply line 242 from a suitable air supply source is connected to air motor 234 via bleed valve 244. A pair of cables 231 are connected at one of the ends thereof to piston drive shaft 235. The cables 231 are connected at the other ends thereof to the document support tray 210 by the U-shaped connectors 233. A plurality of pulleys 232 over which the cables pass define paths over which the cables follow. The cables 231 pass firstly over a pair of juxtapositioned pulleys 232 connected to air motor 234, thence over a second pair of juxtapositioned pulleys 232 connected to side frame plate 222, thence over a third pair of juxtapositioned pulleys 232 connected at the top of side frame plate 222. One of the cables 231 is connected to the U-shaped connector 233 along side frame plate 222 and the other cable 231 follows a plurality of single pulleys 232 connected to cross frame casting 206 and thence is connected to the U-shaped connector 233 along side frame plate 220. Thus, from this arrangement, it may be seen that as air pressure is supplied to the piston of air motor 234 the piston and piston drive shaft 235 are driven to the left as viewed in FIG. 5. This displacement, yields a corresponding displacement of the cables along their defined paths of travel which in turn pivots document support tray 210 clockwise about pivot shaft 211 as viewed in FIG. 3. By controlling the air pressure supplied to air motor 234 through bleed valve 244, the displacement of piston drive rod 235 and hence the position of document support tray 210 may be adjustably controlled.

Referring now to FIGS. 2 and 4, a first drive shaft 257 is rotatably mounted in side frame plate 220 by suitable bearing means. An electromagnetically actuated clutch and brake assembly 230, having a drive sprocket 239 connected thereto is mounted on shaft 257 for intermittent rotation thereof. An AC motor, MOT-1 is connected to side frame plate 220 and provides continuous rotation to drive sprocket 225 via gear reduction assembly 224. A flexible drive chain 226 connects drive sprocket 225 with clutch drive sprocket 229 and passes over a pair of idler sprockets 227 and 228 rotatably mounted on side frame plate 220.

A main drive shaft 256 is rotatably mounted at one end thereof in side frame plate 222, and at the other end thereof is connected to shaft 257 via coupling 258. Main drive shaft 256 is additionally rotatably mounted via a suitable bearing arrangement in casting 207 which is connected to cross frame casting 206 and depending therefrom. An idler shaft 255 is mounted in casting 207 parallel to shaft 256 and spaced therefrom. Idler shaft 255 is held against axial and angular displacement thereof with respect to casting 207 via set screws or other suitable fastening means in casting 207.

A separator drive pulley 213 is centrally located between side frame plates 220 and 222 on main drive shaft 256. Separator drive pulley 213 is connected to main drive shaft 256 via a one-way overriding drive clutch which clutches are generally well known in the art. A pair of cylindrical members 263 having a circumferential groove therein are mounted on main drive shaft 256, via suitable bearing arrangements, one at either side of separator drive pulley 213. Cylindrical members 263 are spaced from the hub of separator drive pulley 213 via suitable spacers and are held against axial displacement along shaft 256 via snap rings or other suitable fasteners. A separator idler pulley 253 is rotatably mounted on idler shaft 255 and held in alignment with separator drive pulley 213 via snap rings or other suitable fasteners.

A flexible separator feed belt 260 formed from a material having a high coefficient of friction is connected between separator drive pulley 213 and separator idler pulley 253. The separator feed belt 260 at the inner surface thereof has a longitudinal tang portion or projection 198 which is received by a corresponding mating arrangement in separator drive pulley 213 and separator idler pulley 253. Separator feed belt 260 at the outer surface thereof has a plurality of longitudinally spaced transverse grooves therein, the purpose of which will hereinafter be more fully explained. The circumferential area of the flanges 199 on separator drive pulley 213 are formed from a material having a high coefficient of friction corresponding to that of separator feed belt 260 and are coplanar with the outer circumference of separator feed belt 260 on separator drive pulley 213.

A nudger or feed wheel 250 formed from a material having a high coefficient of friction is rotatably mounted on stub shaft 248 which in turn is connected to lever arm 246. Lever arm 246 is connected to a bearing assembly 249 which is rotatable with respect to shaft 255. Bearing assembly 249 is axially positioned along shaft 255 intermediate casting 207 and separator idler pulley 253 by suitable spacer means so as to align feed wheel 250 with separator feed belt 260. A feed wheel pulley 251 is connected to the hub portion of feed or nudger wheel 250 and rotates therewith on stub shaft 248. A feed wheel drive pulley 254 connected to separator idler pulley 253 is connected to feed wheel pulley 251 by drive belt 252.

It should be particularly noted that the parameters of the drive train from motor MOT-1 to feed or nudger wheel 250, have been so chosen as to provide an angular surface velocity of feed wheel 250 of approximately four inches per second, and an angular surface velocity of separator feed belt 260 of approximately 14 inches per second. This is done primarily to provide low acceleration to the sheets as they are advanced from the stack by nudger or feed wheel 250 and higher acceleration to the sheets as they pass through the separator area. By applying an initial low acceleration to a sheet in the stack, in many instances only a single sheet is advanced by the nudger wheel 250 to the separator area.

Two pairs of paper guide drive pulleys 264 are connected to drive shaft 256 via set screws or other suitable fastening means, one pair being axially positioned along shaft 256 in a spaced relationship between the separator assembly and side frame plate 220, and the other pair being axially positioned in spaced relationship along shaft 256 between the separator assembly and side frame plate 222. A plurality of paper guide idler pulleys 265 are rotatably mounted on shaft 255 via suitable bearing means and are held in alignment with paper guide drive pulleys 264 via snap rings in shaft 255 or other suitable fastening means. Paper guide drive belts 266 are connected between paper guide drive pulleys 264 and paper guide idler pulleys 265. Paper guide drive belts 266 thus provide an overhead guide path on either lateral side of the separator feed belt 260 moving in the direction of feed.

A feed wheel housing 241 encloses the feed wheel assembly from above and is connected to cross frame casting 206 via screws or other suitable fastening means. A control lever 262 is pivotally mounted within housing 241 via pivot pin 261. A pin 259 connected to lever arm 246 intermediate bearing 249 and stub shaft 248 is received by a slot in control arm 262. Air bleed valve 244 is mounted in casting 207 and is of the type which is rotatable to regulate the flow of air through the valve. A bleed valve actuator rod 243 connected to bleed valve 244 extends therefrom into interfering relationship with pivot pin 259 in lever arm 246 and is normally biased into contact therewith. Control knob 240, which is mounted on housing 241, is connected to lever engaging member 289 and is normally biased upwardly as viewed in FIGURE 3 by spring 290. Lever engaging member 289 engages control arm 262 when control knob 240 is actuated, thus pivoting control arm 262 about pivot pin 261, nudger wheel 250 about shaft 255, and bleed valve actuator rod 243.

A pair of wire rod members 238 are formed at one end thereof into a generally U shaped spring arrangement and are received by the circumferential grooves in cylindrical members 263. Wire rod members 238 extend from cylindrical members 263 toward document support tray 210, around nudger wheel 250, and extend upwardly into housing 241. Wire rod members 238 are spaced from each other on either side of feed wheel 250 and document support member 212. A magnetically actuated reed switch SW-6 mounted within housing 241 is adapted for actuation thereof by a magnet 237 connected to the upper end of one of the wire rod members 238. With sheets on document support tray 210 and in contact with nudger wheel 250, magnet 237 is positioned out of contact with switch SW-6. With no sheets on document support tray 210, magnet 237 is in contact with switch SW-6 since wire rod members 238 are free to contact the surface of the document support tray.

Figure 3:
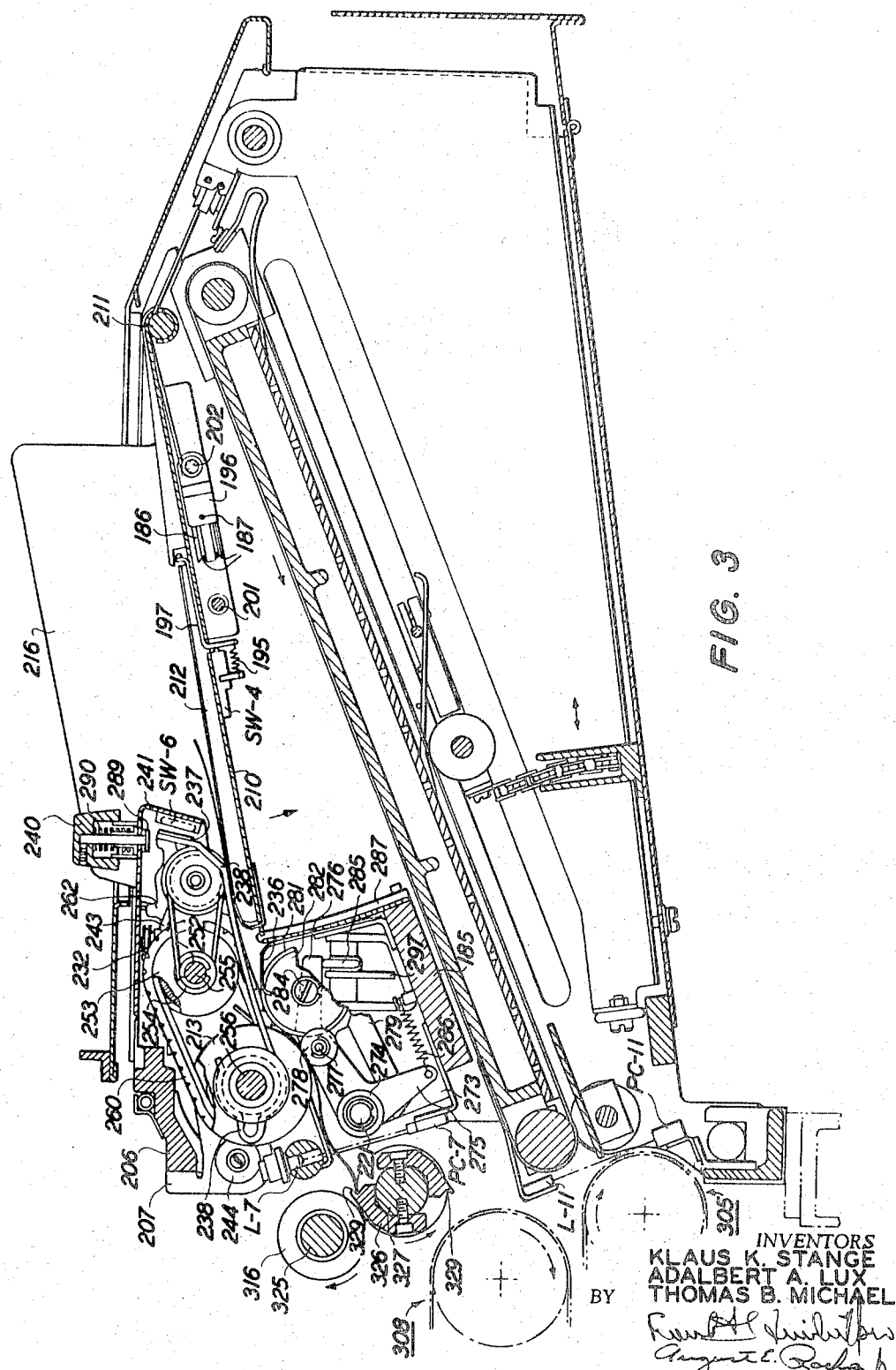
FIGURE 3 is a sectional view taken along the lines 3—3 of FIGURE 2 showing the document feeding and separating apparatus.
Figure 7:
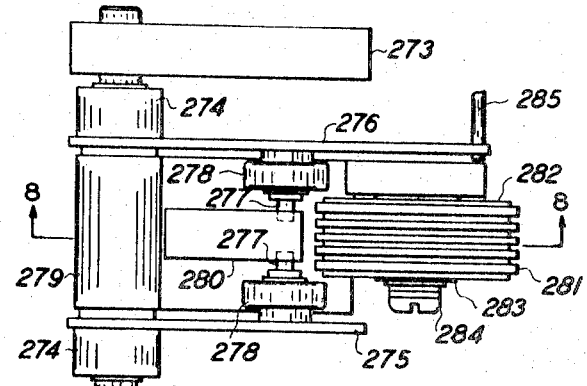
FIGURE 7 is a plan view of the retarding roll or abutment member assembly.
Figure 8:
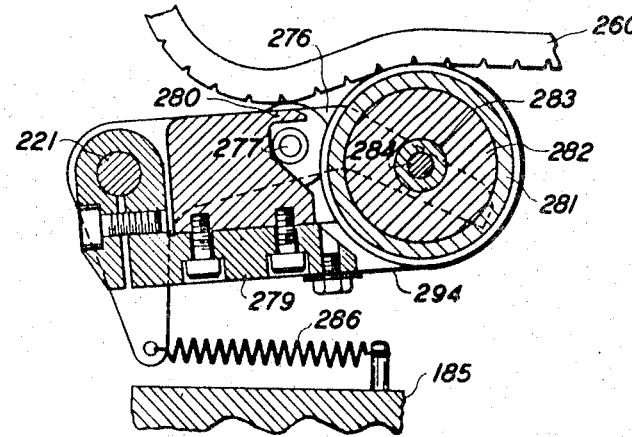
FIGURE 8 is a sectional view taken along the lines 8—8 of FIGURE 7.

Referring now to FIGURES 3, 7, and 8, a support plate 185 extends transversely between side frame plates 220 and 222 and is connected thereto by screws or other suitable fastening means. A shaft 221 extending parallel to support plate 185 is rotatably mounted at one end thereof through side frame plate 222 via suitable bearing means, and at the other end thereof in a bearing block 273 connected to support plate 185. A support member 279 having an upstanding side portion at one end thereof and a bifurcated offset shaft receiving portion at the other end thereof is connected to shaft 221 via bolts or other suitable means extending through the bifurcated portion into support member 279. A retarding roll or abutment member 282 is supported on the upstanding side portion of support member 279 by a one-way clutch and connecting bolt 284. The one-way clutch unit which is connected to support member 279 is of a type which is generally well known and permits abutment member 282 to be rotated in the clockwise direction as viewed in FIGURE 8, but prevents rotation of abutment member 282 in the counterclockwise direction. A friction member 281 formed of a resilient material having a lower coefficient of friction than that of separator feed belt 260, is mounted on retarding roll or abutment member 282 in alignment and engageable with separator feed belt 260.

A pair of crank members 275 and 276 are connected to bearings 274 and are pivotally mounted on shaft 221 at either side of support member 279. A pair of idler rolls 278 having a low coefficient of friction are rotatably mounted on crank members 275 and 276 via stub shafts 277 and are engageable with the flange portions 199 of separator drive pulley 213. Crank member 276 has one arm slightly longer than that of crank member 275, the purpose of which will hereinafter be more fully explained. An idler roll retracting member 280 connected to support member 279 centrally between crank members 275 and 276 has a projection which is engageable with idler stub shafts 277 as shaft 221 is rotated clockwise as viewed in FIGURE 8. A pair of springs 286 connected between crank members 275 and 276 and a pair of pins in support member 185 normally bias idler rolls 278 into positive engagement with the flanges 199 on separator drive pulley 213. A shroud 294 connected to support member 279 extends around the periphery of abutment member 282 to provide a sliding surface into the separator throat. A pair of guide members 236 connected to abutment plate 287 on either side of retarding roll or abutment member 282 extend along the sheet feed path toward the separator to likewise guide advanced documents into the throat. On the exit side of the throat, idler rolls 278 and crank members 275 and 276 provide a guide path over which the advanced sheets follow. At either side of crank members 275 and 276 guide plates 292 and 293 extend toward side frame plates 220 and 222 respectively, to guide advanced documents from abutment plate 287 along the sheet feed path in cooperation with the overhead advancing guide belts 266.

With reference to FIGURE 5, a control lever 239 which extends through the top panel of the desk console is pivotally mounted on side frame plate 222 via pivot 269 and mounting bracket 291. A sector gear 270 on lever 239 meshes with a pinion 247 rotatably mounted on side frame plate 222 via shaft 245. A disc member 271 connected to pinion 247 carries a crank pin 272 at the periphery thereof. A crank arm 223 is connected at one end thereof to shaft 221 and at the other end thereof to crank pin 272 via slot 194. A spring detent 288 connected to side frame plate 222 is received by a notch in disc member 271 for normally holding disc 271 to that rotative position. A switch SW-5 is connected to side frame plate 222 and positioned to be actuated by crank lever 223.

Thus it may be seen as control lever 239 is pivoted clockwise about pivot 269 from the normal position, disc member 271 is driven clockwise overriding the detent action of spring 288. As disc member 271 rotates clockwise pin 272 drives crank lever 223 and shaft 221 clockwise, thus effecting a change in position in the actuator of switch SW-5. As shaft 221 is driven clockwise, support member 279 retracts retarding roll or abutment member 282 from its normal position in substantial engagement with separator feed belt 260 to a disengaged position. As the abutment member 282 is retracted from its normal position, idler roll retractor member 280 likewise retracts idler rolls 278 from engagement with separator drive pulley 213.

With reference to FIGURES 3 and 9, a shaft 325, spaced in the direction of feed from separator drive pulley 213 is rotatably journaled in a pair of side frames 328 and has a plurality of axially spaced friction roll members 316 connected thereto. A second shaft 327, rotatably journaled in side frames 328 and parallelly spaced from shaft 325 has connected to one end thereof a dual lobe switch actuating cam 399. A switch SW-7 is connected to side frame 328 and positioned to be actuated by cam 399.

A plurality of sheet interrupting or sheet engaging members 326 having notched projections 329 thereon are connected to shaft 327 in axial alignment with and extend into the spaces formed between axially adjacent friction roll members 316 on shaft 325. The sheet interrupting members 326 are angularly spaced about shaft 327 in accordance with the spacing between the lobes on cam 399 and may be collectively referred to a sheet registration gate or sheet interrupting means.

A plurality of idler roll members 330 are rotatably mounted on shaft 327 alternately spaced with sheet interrupting members 326 and contact friction roll members 316 on shaft 325 to be driven thereby independent of the rotation of shaft 327.

A third shaft 320, rotatably journaled between side frames 328, is driven by a sprocket 318 connected thereto and a flexible chain drive from the main drive system of the xerographic machine. A gear 319 connected with sprocket 318 meshes with gear 332 on shaft 325 to drive friction roll members 316 and hence idler roll members 330. An electromagnetically actuated indexing clutch 321 on shaft 320 selectively transmits power to position shaft 327 and hence sheet interrupter members 326 via gear 322 on the output drive of clutch 321, idler gear 323 on shaft 325, and drive gear 324 connected to shaft 327.

Thus, it may be seen that friction roll members 316 and idler roll members 330 in effect form a continuously rotating pinch roll arrangement for advancing sheets received by the bite formed between the respective rolls. The sheet interrupting means or registration gate assembly is indexed to a first position in response to an electrical signal to clutch 321 interrupting the advancement of the leading edge of a sheet which forms a hump or buckle in the sheet, and to a second position which releases an engaged sheet into the bite of the pinch roll arrangement. It will be appreciated that a plurality of the sheet engaging members 326 have been illustrated which are angularly spaced about shaft 327 to minimize rotation of shaft 327 between the respective indexed positions.

A pair of photocells PC-7 are positioned between shaft 221 and shaft 327 at one side of the sheet feed path by a mounting bracket connected to support plate 185. A complementary pair of light sources L-7 are positioned between shaft 325 and shaft 256 at the side of the sheet feed path opposite photocells PC-7, and are connected to casting 207 in optical alignment with their respective photocells. Photocells PC-7 and light sources L-7 form a part of the sensing apparatus for indexing the sheet interrupting means previously described. The dual arrangement has proven effective in the event that one portion of an advanced sheet has a mutilated leading edge and would not otherwise interrupt the light beam at the proper position.

Figure 6:
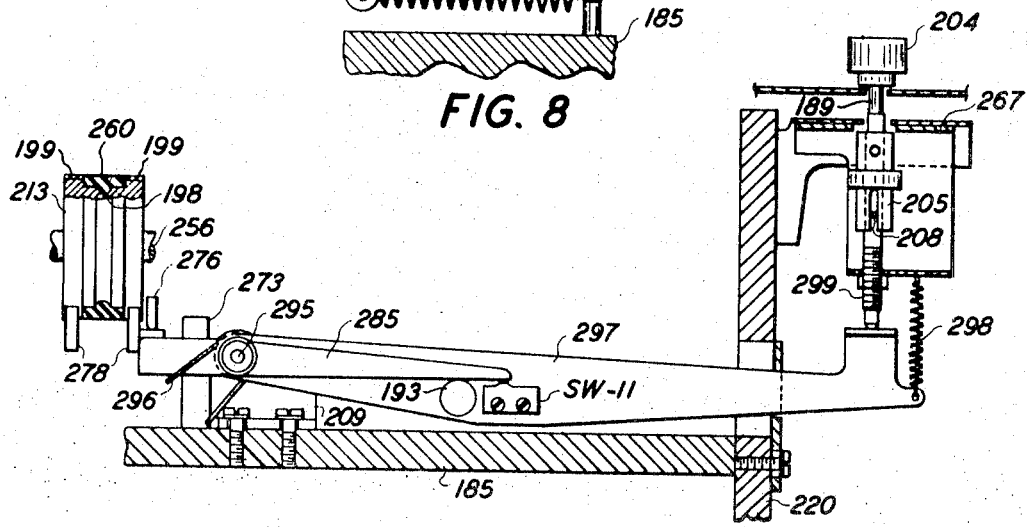
FIGURE 6 illustrates an apparatus for inhibiting the release of a document to the xerographic machine in the event that a malfunction occurs in the feeding and separating apparatus.

FIGURE 6 illustrates apparatus for detecting a malfunction in the feeder-separator device. As shown therein, a support bracket 209 is connected to support plate 185 adjacent bearing block 273. A first lever arm 297 pivotally mounted at one end thereof about pivot shaft 295 extends through said frame plate 220 in opening 268. A second lever arm 285 is pivotally mounted about pivot shaft 295 with one end being engageable with the longer lever arm of crank member 276 and with the other end in engagement with a positive stop member 193 and the actuator of a switch SW-11 connected to lever arm 297. A torsion spring 296 positioned about pivot 295 has one end thereof in engagement with lever arm 285 and the other end thereof in engagement with support bracket 209. Spring 296 thus normally biases lever arm 285 in a clockwise direction about pivot shaft 295 into engagement with positive stop member 193. An adjusting screw 299 is connected to support bracket 267 and is engageable with the end of lever arm 297 projecting through side frame plate 220. A spring 298 connected between support bracket 267 and lever arm 297 biases lever arm 297 into engagement with adjusting screw 299 in opposition to the force exerted by torsion spring 296.

An adjusting knob 204 projecting above the top panel of the desk console is connected to an annular collar member 205 via shaft 189. An axial slot in collar member 205 receives a pin 208 connected to adjusting screw 299 for providing positive rotation of adjusting screw 299 by rotating knob 204 and at the same time permitting axial displacement therein.

From this arrangement adjusting knob 204 may be set to permit a predetermined amount of displacement of idler roll 278 as advancing sheets pass between idler roll 278 and the flange 199 on separator drive pulley 213 without actuating lever arm 285 and switch SW-11. However, in the event that idler roll 278 is displaced more than the predetermined amount by the passage of more than a single sheet or the passage of a wrinkled or crumpled sheet, switch SW-11 will be actuated thereby. If switch SW-11 has been thus actuated the sheet interrupting means previously described will not release the document or documents to the continuously rotating friction rolls 316 and idler rolls 330.

Reference will now be made to the logic circuitry of FIG. 10 which provides the necessary control over the document feeder and transport system of the xerographic machine.

Figure 10:
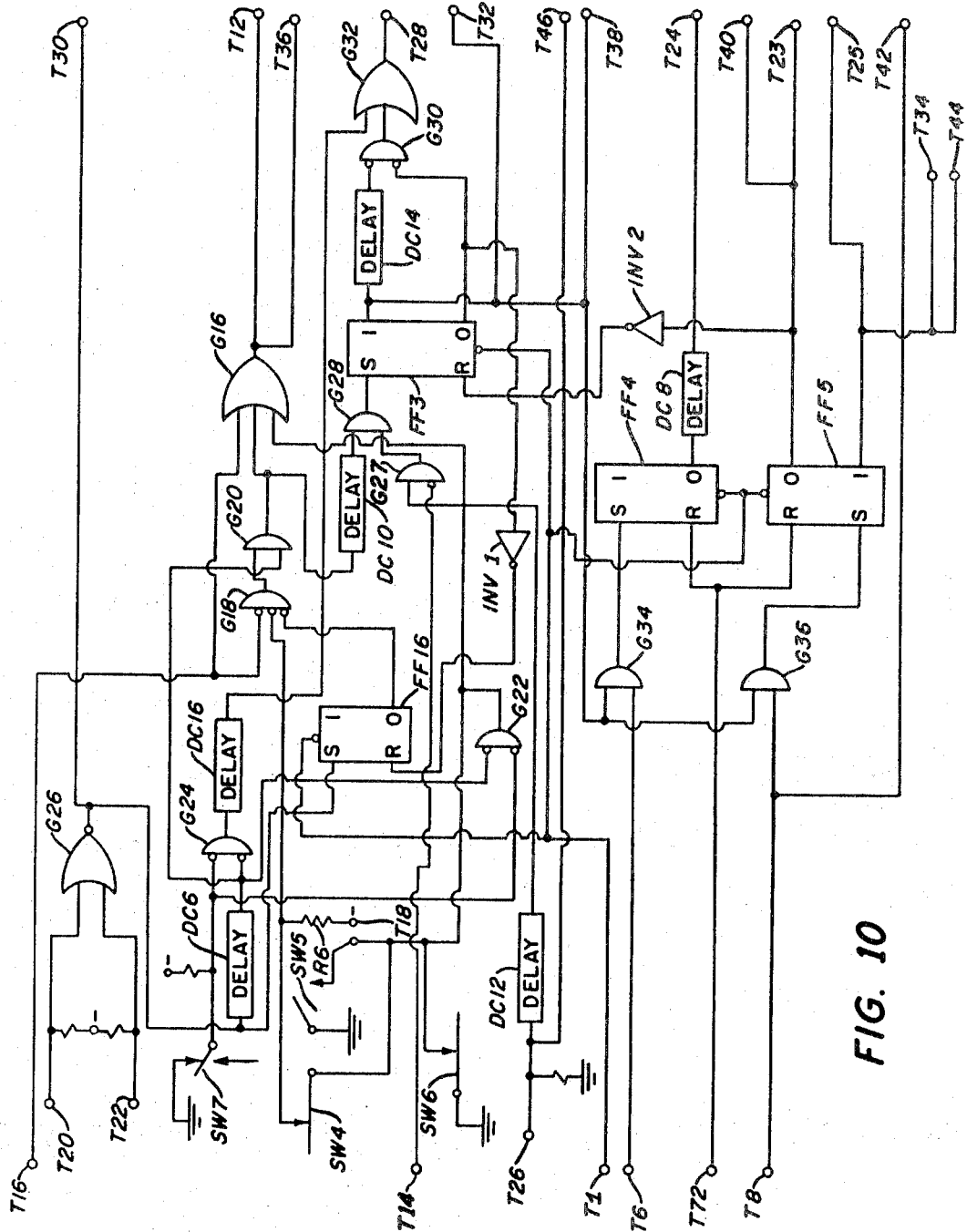
FIGURE 10 is a schematic of the circuit arrangement which controls the operation of the feeding and separating apparatus.

The document feeder brake is activated by a high level signal at output terminal T-12 in FIGURE 10. The level of this signal is determined directly from the conditions of the three inputs to OR gate G-16.

One of these conditions is a print or stop print condition of the xerographic machine which is indicated to the circuit of FIG. 10 through input terminal T-16 which is directly connected as one input to OR gate G-16. In the stop print condition the signal present at this input terminal T-16 is at a high level, while in the print condition this signal is at a low level.

A second input to OR gate G-16 is derived directly from the output of AND gate G-20. The condition of this signal will be described in detail hereinafter.

The last or third input to OR gate G-16 is derived initially from either the output of AND gate G-22 or from one of three switches.

The first switch SW-4 is a carrier switch referred to earlier in connection with FIG. 3 and is in its position as shown in FIG. 10 during the automatic operation of the apparatus. If the operator elects to feed documents to the apparatus manually then a carrier of transparent material may be employed to support the document to be copied. This carrier when the trailing edge is inserted in the switch actuator on the support tray will open the carrier switch SW-4.

The second switch, manual-automatic switch SW-5, is shown in its normally opened position when the machine is operating in an automatic mode. This switch is mechanically linked to the manual-automatic control previously alluded to in connection with FIG. 5.

The third switch, a document feed switch SW-6, is as shown in FIG. 10 in its normally opened condition indicative of the fact that there are documents in the document support tray. This switch was described earlier in connection with FIG. 3.

For purposes of this example, the manual-automatic switch SW-5 is in its optned condition and the document feed switch SW-6 is also in an opened condition as illustrated in FIG. 10. The carrier switch SW-4 is closed connecting a source of low voltage applied at terminal T-18 through a suitable resistor R-6 directly to OR gate G-16.

AND gate G-22 has one input connected through an input inverter to the junction between delay circuit DC-6 and the input inverter associated with AND gate G-24. The signal from this junction represents the output from OR gate G-26 which monitors the output of the two photocells PC-7 coupled to input terminals T-20 and T-22 previously referred to in connection with FIG. 3.

These two photocells function to detect the lead edge of a document as it leaves the document feeder moving toward the feed rollers 316 and 330. In order to so function, the photocells PC-7 and their respective light sources L-7 are positioned intermediate the document feeder and the feed rollers 316 and 330. Two spaced apart photocells are utilized instead of one photocell in this situation to insure accurate lead edge detection even in the case of a multilated document having an irregular and discontinuous lead edge.

When no document is detected, the output at this junction is a low level signal which serves to enable this input of AND gate G-22 after being inverted by the input inverter.

The other input to AND gate G-22 through an input inverter is from a document gate switch SW-7 which, as noted in the description of FIG. 9, is cam operated to indicate the position of the document gate. When this switch is closed, as illustrated in FIG. 10, the document gate is up to obstruct the passage of a document from the document feeder toward the exposure transport system of the xerographic machine. If the document gate switch SW-7 is open, then the document gate is down or released to permit the passage of a document from the document feeder through the feed rollers to the exposure transport system. An illustrated, a high level signal is applied to the input inverter associated with AND gate G-22 which is connected to the arm of the document gate switch SW-7.

The combination of a high level signal from the document gate switch SW-7 and a low level signal from the delay circuit DC-6 when no document is detected by photocells PC-7 provide a low level signal at the output of AND gate G-22 which is supplied directly as an input to OR gate G-16.

The input to OR gate G-16 from AND gate G-20 is determined by four signal conditions. The first three of these signal conditions are monitored by AND gate G-18, the output of which is a direct input to AND gate G-20. These will now be described.

One signal condition is print or stop print condition, the former being a low level signal while the latter is a high level signal.

A second condition is the state of carrier switch SW-4 which, in its normally closed condition for automatic operation, is represented by a low level signal also.

The third signal condition at the input of the AND gate G-18 is the condition of flip-flop FF-16, the zero output of which is connected to AND gate G-18. This flip-flop is initially in a set condition as a result of a signal at input terminal T-1 when the apparatus is first energized by the operator. In this set condition a low level signal is connected to the input inverter associated with AND gate G-18. The set input of flip-flop FF-16 is connected to the output of OR gate G-26. The reset input of this flip-flop is connected via an inverter INV-1 to the zero output of flip-flop FF-3. When the xerographic machine is first energized, this flip-flop FF-3 is placed in a reset condition providing a high level signal at its zero output and a low level signal at its one output. In this condition, the signal from the zero output of flip-flop FF-3 does not affect the initial set condition of flip-flop FF-16.

The fourth signal condition monitored by AND gate G-20 is derived from the output of delay circuit DC-6. Initially, photocells PC-7 will not detect a document passing through the document feeder since the apparatus has just been activated and the output of OR gate G-26 and delay circuit DC-6 will be at a low level.

Prior to the depression of a print push button on the control panel, OR gate G-16 will have as inputs two low level conditions derived from the output of AND gate G-18 and AND gate G-22. A high level signal is supplied to OR gate G-16 from terminal T-16. This high level signal is passed by OR gate G-16 to terminal T-12 to energize the document feeder brake. After the operator has placed the documents and card stock in their respective feeders, and the print push button is depressed, this high level signal at terminal G-16 is removed thereby de-energizing the document feeder brake and initiating feeding of the first document into the apparatus.

With the document feeder feeding the first document after depression of the print button by the operator, this first document advances so as to interrupt the light incident upon either of the photocells PC-7 referred to previously in the description of FIG. 3. As the lead edge of the first document fed interrupts this light path, the output of NOR gate G-26 goes to a high level condition. This low-high level transition is delayed by delay circuit DC-6 connected to the output of NOR gate G-26. After the expiration of this delay the output of delay circuit DC-6 goes to a high level condition thereby enabling its respective input to AND gate G-20. In addition, AND gate G-22 is disabled along with AND gate G-24 via the input inverters associated with these AND gates.

It is noted that this low-high level transition does not affect the condition of flip-flop FF-16 since it is already in a set condition.

The enabling of AND gate G-20 provides a high level signal at terminal T-12 via OR gate T-16 to energize once again the document feeder brake after the time period of delay circuit DC-6.

As was noted previously, document gate switch SW-7 was in a condition indicative of the fact that the document gate was thwarting passage of any document from the document feeder to the transport system. Therefore, due to the spacing of the photocells PC-7 relative to the document feeder and the document gate along with the time delay provided by the delay circuit DC-6, the document feeder is permitted to run long enough to effect a buckle or warped condition in the first document fed through the document feeder. This occurs since this document abuts the document gate while the document feeder continues momentarily its feeding operation. However after the aforementioned time interval designed into delay circuit DC-6, has elapsed, the document feeder brake is energized and the feeder is stopped.

When the output of AND gate G-20 goes to a high level, a low-high level transition is provided at the input of the delay circuit DC-10 and is delayed for a specified period of time necessary to insure that from the initiation of the document feeder the first document has in fact been buckled at the registration gate. After the lapse of the delay provided by delay circuit DC-10 the input of AND gate G-28 connected to the output of delay circuit DC-10 is enabled. The enabling of AND gate G-28 is delayed also to insure that a slot in the transport belt will not be sensed until a document is buckled at the document registration gate.

The next event is the detection of a slot in the highly reflective surface of the document transport belt 305. When this slot is detected by slot sense photocell PC-9, a low-to-high level transition is provided at input terminal T-26 which is connected to the input of delay circuit DC-12 which delays this transition. The delay of circuit DC-12 is utilized to insure that the document gate will not be released until the slot is in such a position as to permit the advancing document to bisect the slot rather than completely cover it.

The amount of delay afforded by delay circuit DC-12 of the slot sense signal will be dependent in part upon the exact position of the slot when it is sensed by the photocell relative to the speed of the transport belt as will become more apparent hereafter.

After the elapse of the delay of circuit DC-12, one input to AND gate G-27 is enabled. The other input to this gate is connected via an input inverter to terminal T-14. The signal supplied to this terminal originates from the double feed or malfunction detector switch SW-11 which is actuated by the malfunction detector mechanism previously described in connection with FIG. 6. This signal will be at a low level in the absence of the detection of a malfunction thereby enabling AND gate G-27.

With the enabling of AND gate G-27, AND gate G-28 is enabled to generate a setting signal to the set input of flip-flop FF-3. When the flip-flop goes into a set condition the zero output goes to a low level which is inverted by inverter INV-1 to afford a resetting pulse to flip-flop FF-16 thereby disabling AND gate G-18 connected to this output of flip-flop FF-16 via an input inverter.

The disabling of AND gate G-18 disables AND gate G-20 to return the output of this gate to a low signal level. This, in turn, provides a low level signal at output terminal T-12 via OR gate G-16 to release the document feeder brake and commence operation of the feeder.

With flip-flop FF-3 now in a set condition, the low-high level transition in its one output is delayed by delay circuit DC-14 to provide a pulse at output terminal T-28 of OR gate G-32 having a duration equal to the delay period circuit DC-14. This delay typically may be 13 milliseconds. This pulse is passed by AND gate G-30 which has one input connected via an input inverter to the output of delay circuit DC-14 and another input connected through a similar input inverter to the zero side of flip-flop FF-3. This pulse generated at output terminal T-28 will effect the release of the document held in buckled configuration by the document gate by energizing the document gate solenoid which is coupled to output terminal T-28.

With the release of the document gate, the document gate switch SW-7 is now in an opened condition providing a low level signal to the input inverter associated with AND gate G-22 and G-24. This effectively enables the respective inputs of these AND gates.

The document gate having been released to permit the document it was holding, to enter the bite between the feed rollers, the document now continues under the influence of the feeder and feed rollers 316 and 330 referred to previously in connection with the description of FIGS. 3 and 9. The document proceeds onto the exposure transport belt in such a manner that its lead edge bisects the area of a slot in the transport belt.

As the document advances onto the document transport system, the trailing edge of this document will pass over photocell PC-7 and thereby re-establish light incident on the photocells. This will immediately provide a low level signal at the output of NOR gate G-26 which will enable AND gate G-22 and G-24 providing a high level signal at the output of each of these AND gates.

The high level signal at the output of AND gate G-22 will be passed by OR gate G-16 to output terminal T-12 energizing the document feeder brake and terminating the operation of the feeder.

The enabling of AND gate G-24 will provide a low-high level transition at the input of delay circuit DC-16 which will delay this transition for a predetermined period of time, for example, 57 milliseconds. After this elapse of time, a high level signal will be translated by OR gate to output terminal T-28 reinstating the document registration gate in its initial position to abut the next document fed from the document feeder. The amount of this delay afforded by delay circuit DC-16 is dictated by the amount of time required to move the trailing edge of the document from immediately above photocells PC-7 to a position where it is clear of the document gate to insure that the document gate, when reinstated, does not damage the document.

With the document gate reinstated, document gate switch SW-7 once again disables AND gate G-22 and G-24 terminating the high level signals at output terminal T-28 as well as once again providing a low level signal at the output of AND gate G-22 which is translated to OR gate G-16.

Since OR gate G-16 has at its input only low level signals, the feeder is once again energized through the release of the document feeder brake.

The status of the circuitry of FIG. 10 is such now as to have photocells PC-7 exposed to light, the document gate switch is again closed as illustrated in FIG. 10, the slot sense photocell is detecting the reflections from the surface of the document transport belt, and the feeder has commenced feeding the second document from the document support tray. This document will continue to be fed until it interrupts the light incident upon either of photocells PC-7 whereby the stopping of the feeder as outlined above will be repeated with the exception that flip-flop FF-16 which was in its reset condition will be set upon the detection by photocells PC-7 of the lead edge of the second document.

This second document will maintain its buckled condition against the document registration gate until such time as the slot sense photocell detects the slot in the document transport belt when the document transport belt is moving.

As the document is deposited on the exposure transport belt 308 by feed rollers 316 and 330, the document is electrostatically tacked to the transport belt and moves into the exposure zone. A slow photocell PC-3 in the exposure zone detects the lead edge of the document through the slot and the change from light to dark generates a signal at input terminal T-6 which enables one input of AND gate G-34. The other input of this AND gate, as well as one input of AND gate G-36, is connected to the one output of flip-flop FF-3 and, while this flip-flop is in a set condition, is enabled. Therefore, the signal indicative of the passage of the lead edge covering a portion of the slot in the exposure transport belt past slow photocell PC-3 sets flip-flop FF-4 disengaging the high speed exposure transport clutch connected to output terminal T-24.

The enabling of AND gates G-34 and G-36 with the set condition of flip-flop FF-3 insures that the slow photocell will only be able to slow down the speed of the document transport when a document is actually on the transport as signified by the set condition of flip-flop FF-3. Otherwise, the slow photocell will detect the trailing edge of the slot in belt 308 and slow the transport belt even if a document is not on the belt.

It should be noted that the delay circuit DC-8 in the zero output circuit of flip-flop FF-4 does not delay this negative-going signal since this delay is effective only in regards to a positive-going signal.

When this occurs, the exposure transport speed will be reduced from a relatively high speed to a slower speed under the influence of the slow speed clutch connected to output terminal T-25 associated with flip-flop FF-5. The lead edge of the document bisecting the slot continues now at a slower speed in the exposure zone and approaches a stop photocell PC-4.

Immediately upon the detection by the stop photocell PC-4 of the lead edge of the document bisecting the slot, a signal is generated at input terminal T-8 which enables a respective input of AND gate G-36 to effect the setting of flip-flop FF-5. Upon the placing of flip-flop FF-5 in its set condition, the slow speed clutch connected to output terminal T-25 is de-energized and the exposure transport brake energized thereby stopping the exposure transport with the document now properly registered in the exposure zone. Also coincident with the setting of flip-flop FF-5 is the resetting of flip-flop FF-3, the reset input side of which is connected to the zero output of flip-flop FF-5 via inverter INV-2. The resetting of flip-flop FF-3 inhibits AND gates G-34 and G-36 and maintains the output of OR gate G-32 at a low level.

From the preceding description of the slot sensor circuitry and the document feeder control, the inter-relationship between the delay of circuit DC-12, the position of slot sense photocell, the speed of the exposure transport belt 308, the output of the pinch rollers, and the conveying speed of the pinch rollers are all of some criticality. Each individual factor may be altered only with a compensating adjustment in one or more of the other factors.

With these factors being carefully selected, upon release of the document gate the pinch or feed rollers will convey the document onto the transport belt in such a manner that the belt slot will be bisected by the lead edge of the document. This relationship must be achieved in order to obtain high quality images of of the subject documents.

To feed documents into the xerographic machine for processing in the manual mode, abutment member 282 is retracted from its normally engaged position by positioning lever 239 as previously described. In the retracted position, a document may be manually inserted through the separator area via a transparent document carrier to contact the sheet registration gate 326. The trailing edge of the document or carrier is then inserted to contact switch actuator 197 of carrier switch SW-4 to enable the gate release circuit previously described. By inserting the trailing edge of the document or document carrier into the switch actuator 197, a hump or buckle is formed in the sheet which forces the sheet into friction feed rolls 316 and 330 upon release of sheet registration gate 326. With a document thus in place, registration gate 326 is released in response to a signal from the logic circuit as previously described.

To feed documents into the xerographic machine for processing in the automatic mode, paper guide plates 214 and 216 are laterally positioned on document support tray 210 to receive the stack, or if certain types of cards are being processed, guide plate 218 is raised to its upstanding position.

Depression of control knob 240 through the actuator linkage connected to bleed valve 244 and nudger wheel lever arm 243 pivots the nudger wheel assembly in the counterclockwise direction about shaft 255 and rotates bleed valve 244 to release the air pressure acting against the piston in air motor 234. As the air pressure is released from air motor 234, document support tray 210 is lowered from its raised position as illustrated in FIG. 3 to a lowered position engaging a projection on abutment plate 287. The stack of documents is then positioned on the document support tray 210 over document support rib 212 with the leading edges of the stack contacting abutment plate 287.

After positioning the stack of documents on document support tray 210, control knob 240 is released lowering the nudger wheel assembly from its raised position and rotating bleed valve 244 to again supply air pressure to air motor 234. As air is supplied to air motor 234, the document support tray 210 is elevated to a position wherein the uppermost sheet in the stack of documents contacts nudger wheel 250. The document support tray 210 and the stack of documents thereof continue to rise as viewed in FIG. 3, raising the nudger wheel assembly therewith and bleed valve actuator rod 243 thereby rotating bleed valve 244. As bleed valve 244 is rotated, the pressure acting on air motor 234 is decreased until a point of equilibrium is achieved with the nudger wheel 250 resting on the uppermost sheet in the stack. In this position wire rod guide members 238 are supported by the uppermost sheet in the stack, having been pivoted counterclockwise about shaft 256 to a position wherein magnet member 237 is no longer in contact with magnetically actuated document feed switch SW–6 thus conditioning the logic circuitry as previously described.

With lever 239 in the automatic feed position the retarding roll or abutment assembly is in substantial engagement with separator feed belt 260 and this position is sensed by manual-automatic switch SW–5 also previously described.

With all of the conditions having been satisfied as previously described, a pulse from the control logic of the xerographic machine releases the brake and energizes the clutch of electromagnetically actuated clutch and brake assembly 230 thus rotating shaft 256 in a clockwise direction as viewed in FIGURE 3. Shaft 256 drives separator drive pulley 213 via the overriding one-way drive clutch connecting shaft 256 to separator drive pulley 213. As shaft 256 rotates, paper guide drive belts 266 are driven to provide a moving overhead guide for the documents as they are advanced to the sheet registration gate. As separator feed belt 260 is driven by separator drive pulley 213, nudger or feed wheel 250 is thereby driven through the belt and pulley arrangement. In most instances as nudger wheel 250 rotates, only the uppermost sheet in the stack will be advanced into contact with separator feed belt 260 and stationary retarding roll or abutment member 282. In this case the single sheet passes over the lower paper guide members 236 into the throat formed between the separator feed belt 260 and stationary abutment member 282.

Because of the respective coefficients of friction of the separator feed belt 260 and abutment member 282, the tractive forces acting on the single document as it passes into the wrap are such that the separator feed belt 260 advances the sheet over abutment member 282 and into the bite formed between separator drive roll 213 and idler rolls 278 thus providing a positive take-away force acting on the advanced sheet. The transverse longitudinally spaced notches in separator feed belt 260 and the circumferential grooves in the resilient friction member 281 on abutment member 282 substantially enhance the differential tractive forces between the respective members.

With the sheet registration gate 236 indexed to the position as illustrated in FIG. 3, the sheet is advanced toward the gate interrupting the light from light sources L–7 impinging upon photocells PC–7. The sheet is further advanced into contact with sheet engaging portions 329 of sheet registration gate 326 for a fixed time delay period until a buckle or hump is formed in the advanced sheet. At this point, operation of the feeder separator apparatus is interrupted by a suitable pulse to electromagnetically actuated clutch and brake assembly 230. Thereafter, in response to a signal received from photocell PC–9 associated with the transport apparatus 308, the gate is indexed to the released position allowing the sheet to extend into the bite formed between friction members 316 on shaft 325, and the idler roll members 330 on shaft 327. Responsive to the release of sheet registration gate 326, cam 399 is rotated, actuating document gate switch SW–7 which again actuates the feeder separator apparatus for a fixed period of time. This actuation is for the purpose of completing the advancement of a sheet through the separator area while it is being advanced by the rotating feed rolls 316 and 330.

After the trailing edge of the previously advanced sheet passes from the interfering position between light sources L–7 and photocells PC–7 and a fixed time delay period, sheet registration gate 326 is indexed from its released position to the sheet engaging position and the feeder separator apparatus is again driven to advance another sheet toward the sheet registration gate.

In the event that more than a single sheet is advanced into the separator apparatus by nudger wheel 250, the separating arrangement between separator feed belt 260 and retarding roll or abutment member 282 provides a very effective and efficient separating apparatus for delivering only a single sheet to the sheet registration gate 326. For example, if the top four sheets in a stack adhere together and are advanced to the separator apparatus, they may all four together enter into the throat formed between belt 260 and abutment member 282 and will be separated therein.

It will be appreciated that rather than being centrally located between the axis of shaft 256 and shaft 255, abutment member 282 is spaced closer to shaft 256 in substantial contact with belt member 260 thereby forming a wrap about abutment member 282. At the exit of the separator throat, it will also be appreciaed that abutment member 282 is spaced only slightly from separator drive pulley 213, approaching the condition of a positive bite therebetween. This arrangement in the dynamic condition, that is, when belt member 260 is being driven over the surface of abutment member 282, yields a varied distribution of normal forces exerted by the belt member 260 on retarding roll 282. This condition therefore allows a slug or quantity of sheets advanced by the nudger wheel 250, such as the four exemplary sheets, to enter the throat, displacing the belt 260 away from abutment member 282. Because of this deflection, additional normal forces are exerted on the pack of sheets in the wrap which causes a deflection of the resilient friction member 281 on abutment member 282 where it is in contact with the lowermost sheet in the pack. As a result of this action and the resiliency of friction member 281, friction member 281 now engages the lead edge of the lowermost sheet in the pack in addition to being in engagement with the lower surface thereof. This, therefore, allows only the upper three sheets to be further advanced in the pack causing a shear between the third and fourth sheets. As the remaining three sheets are advanced the third sheet in the pack then engages friction member 281 in a similar manner which causes a shear between the second and third sheets. This process is repeated until only the uppermost sheet remains in contact with the belt member 260 and friction member 281. When this condition is met the uppermost sheet is therefore free to pass through the throat into contact with the bite formed between separator drive pulley 213 and idler rolls 278 thereby providing a positive takeaway force exerted on the single document as it is advanced to the sheet registration gate 326.

It has been found for a wrap angle of approximately 25° a slug of sheets each being 3 mils in thickness and numbering 10 sheets in the slug can be inserted into the separator throat with complete and effective separation without the feeding of more than a single sheet past the exit of the throat. Thus from this arrangement it can be seen that by providing a stationary retarding roll or abutment member such as 282 having a frictional surface thereon which is positioned in substantial contact with a separator feed belt member such as 260 with the abutment member being spaced slightly off center from the axis of rotation of the members driving the separator feed belt, a very effective and highly reliable apparatus for separating stacked sheets is obtained.

While the invention has been described with reference to the structure disclosed herein, it is not confined to the

What is claimed is:

1. Means for advancing and separating superposed sheets having varied physical characteristics comprising,
   a retarding member having a curved frictional resistive surface thereon,
   means supporting said retarding member to confine the frictional resistive surface thereon against movement in the direction of feed,
   a pair of pulleys journaled for rotation opposite said retarding member on either side thereof in the direction of feed, said retarding member and said pulleys being relatively positioned so that a line tangent to both pulleys intersects a portion of the curved surface of said retarding member,
   a flexible endless belt member entrained about said pulleys and forming an arcuate wrap over the surface of said retarding member to define a throat, said belt member having a frictional resistive surface thereon with a coefficient of friction greater than the coefficient of friction for said retarding member,
   means for supporting a stack of sheets adjacent said throat,
   nudging means for advancing at least the uppermost sheet in the stack into said throat, and
   drive means for driving said belt member and said nudging means in a direction to advance said uppermost sheet from said stack and through said throat.

2. Apparatus according to claim 1 wherein said belt member is driven at a peripheral velocity of at least twice the peripheral velocity of said nudging means.

3. Apparatus according to claim 1 further including, means for retracting said retarding member from contact with said belt member whereby to permit passage of multiple sheets through said separating means.

4. Apparatus according to claim 1 wherein said stack supporting means includes,
   a sheet support member pivoted at one end thereof, extending beneath said nudging means and engageable therewith,
   sheet support drive means operatively connected to said sheet support member for adjustably positioning said support member about said pivot, and
   control means interconnecting said sheet support drive means and said nudging means for actuating said sheet support drive means thereby pivoting said support member in response to a displacement of said nudging means.

5. Apparatus according to claim 4 further including, selectively positioned sheet guide means connected to said sheet support member for providing transverse alignment of the sheets on said support member.

6. Apparatus according to claim 1 further including, continuously driven sheet advancing means spaced from the exit of said throat in the direction of feed,
   sheet interrupting means between said continuously driven sheet advancing means and said throat,
   control means adapted to disable said drive means responsive to a sheet being advanced into contact with said sheet interrupting means and forming a buckle therein, and
   means for releasing said sheet interrupting means and an engaged sheet whereby the buckle in said sheet will advance the leading edge thereof into contact with said continuously driven sheet advancing means.

7. Apparatus according to claim 6 further including, means for detecting the passage of more than one sheet from said throat and adapted in response thereto to inhibit release of said sheet interrupting means to said continuously driven sheet advancing means.

8. Apparatus according to claim 6, said control means including,
   means for detecting the leading edge of a sheet between said sheet interrupting means and said throat, and
   means for disabling said drive means a fixed time delay period after a leading edge is detected thereby.

9. Apparatus according to claim 6 further including, idler roll means positioned adjacent the exit of said throat and engageable with one of said pulleys thereat for deflecting a sheet exiting from said throat toward said sheet interrupting means.

10. Apparatus according to claim 9 further including, means for yieldably biasing said idler roll means toward said pulley, and
    means operatively connected to said idler roll means for inhibiting release of said sheet interrupting means in the event that said idler roll means is deflected from said pulley more than a predetermined distance.

11. Apparatus according to claim 6, said control means including,
    means for detecting the trailing edge of a sheet between said sheet interrupting means and said throat, and
    means for enabling said drive means and indexing said sheet interrupting means to the sheet engaging position a fixed time delay period after a trailing edge is detected thereby.

12. An articulate sheet guide system adapted for use in sheet handling apparatus to impart transverse alignment to sheets in a first area such as a sheet feeder and the same transverse alignment to sheets in a second area such as a sheet stacking apparatus comprising,
    a first pair of sheet guide members associated with said first area,
    means slidably mounting said first guide members for transverse positioning in said first area,
    a second pair of sheet guide members associated with said second area,
    means slidably mounting said second guide members for transverse positioning in said second area,
    means interconnecting said first guide members whereby transverse positioning of one of said guide members effects a corresponding complementary transverse displacement of the other of said guide members,
    means interconnecting said second guide members whereby transverse positioning of one of said guide members effects a corresponding complementary transverse displacement of the other of said guide members, and
    means interconnecting the said pairs of guide members whereby transverse positioning of any one of said guide members effects transverse displacement of the others of said guide members.

13. Apparatus for separating superposed sheets comprising,
    means defining a path through which said superposed sheets are advanced including,
    retarding means having a convexly curved frictional resistive surface thereon,
    means supporting said retarding means at one side of said path, said supporting means confining said retarding means against movement in the direction of feed,
    a pair of pulley members journaled for rotation at one side of said path opposite said retarding means, said pulley members being spaced along said path on either side of said retarding means in the direction of feed, one of said pulley members being positioned in close proximity to the surface of said retarding means,
    a belt member entrained about said pulley members having a surface in substantial contact with said retarding means and being deflected thereby, said belt member being formed from a material having a higher coefficient of friction than the coefficient of friction for the surface of said retarding means, and
means for driving said belt member about said pulley members and over the surface of said retarding means whereby to separate superposed sheets between said belt member and said retarding means.

14. Apparatus according to claim 13, said convexly curved surface having a plurality of alternating transversely spaced ridges and grooves extending longitudinally in the direction of feed, and
said belt member having a longitudinal series of transverse alternately spaced ridges and grooves on the surface thereof.

15. Apparatus according to claim 13 further including means mounting said retarding means about a pivotable axis, and
control means for selectively pivoting said mounting means about said pivotable axis, whereby to selectively position said retarding means into and out of engagement with said belt member.

16. Sheet feeding and separating apparatus of the type wherein sheets are advanced from the top of a stack comprising in combination,
means for supporting a plurality of sheets in a stacked relationship,
nudging means engaging the uppermost sheet in a stack and adapted when driven to advance at least the uppermost sheet in the direction of feed,
first and second pulley members journaled for rotation and spaced from each other and said nudging means in the direction of feed,
endless flexible belt means having a high coefficient of friction entrained about said first and second pulley members,
abutment means having a convexly curved surface thereon and being formed from a resilient material having a coefficient of friction less than that for said belt means,
means mounting said abutment means about a pivotable axis,
control means operatively connected to said abutment mounting means for selectively positioning said abutment means to a first position wherein said convexly curved surface is in substantial contact with said belt means forming a wrap thereover defining a throat, and to a second position wherein said convexly curved surface is out of contact with said belt means, and
drive means for intermittently driving said belt means and said nudging means.

17. Apparatus according to claim 16 further including,
a pair of continuously driven segmented friction roll members spaced from said belt means and said abutment means in the direction of feed, and
sheet interrupting means coaxial with one of said segmented friction roll members rotatably positioned in response to a first predetermined signal whereby to interrupt advancement of a sheet into the bite formed between said friction roll members, and rotatably positioned in response to a second predetermined signal to release an engaged sheet into the bite formed between said friction roll members.

18. Apparatus according to claim 17 wherein said stack supporting means includes,
a sheet support member pivoted at one end thereof, extending beneath said nudging means and engageable therewith,
sheet support drive means operatively connected to said sheet support member for adjustably positioning said support member about said pivot, and
control means interconnecting said sheet support drive means and said nudging means for actuating said sheet support drive means thereby pivoting said support member in response to a displacement of said nudging means.

19. Apparatus according to claim 17 wherein said stack supporting means includes,
a pair of upstanding sheet guide members extending longitudinal to the direction of feed and slidably mounted for transverse positioning thereon, and
means interconnecting said sheet guide members whereby the transverse positioning of one of said guide members effects a corresponding complementary transverse displacement of the other guide member.

20. Sheet feeding and separating apparatus of the type wherein sheets are advanced from the top of a stack comprising in combination,
means for supporting a plurality of sheets in a stacked relationship,
nudging means engaging the uppermost sheet in a stack and adapted when driven to advance at least the uppermost sheet in the direction of feed,
first and second pulley members journaled for rotation and spaced from each other and said nudging means in the direction of feed,
endless flexible belt means having a high coefficient of friction entrained about said first and second pulley members,
retarding means having a convexly curved frictional resistive surface thereon,
means supporting said retarding means with the curved surface thereof in substantial contact with said belt means, said retarding means deflecting said belt means to form a wrap thereover defining a throat, said supporting means confining said retarding means against movement in the direction of feed,
means for driving said belt means about said pulley members and over said retarding means, and
means for driving said nudging means to advance sheets from said stack into said throat.

21. Apparatus for feeding and delivering sheets comprising in combination,
a pair of continuously driven segmented friction roll members positioned oppositely adjacent each other to form a bite therebetween for engaging and advancing sheets,
sheet interrupting means mounted coaxial with one of said segmented friction roll members and adapted for rotation about the axis thereof from a first position interrupting the advancement of a sheet into the bite formed between said friction roll members to a second position to release an engaged sheet into the bite formed between said friction roll members, and
means for indexing said sheet interrupting means to said sheet interrupting position in response to a first predetermined signal and for indexing said sheet interrupting means to said sheet releasing position in response to a second predetermined signal.

References Cited
UNITED STATES PATENTS

| | | |
|---|---|---|
| 1,167,367 | 1/1916 | Wells. |
| 2,565,459 | 8/1951 | Willett 271—3 X |
| 2,583,506 | 1/1952 | Breman 271—37 |
| 3,027,161 | 3/1962 | Solyst 271—10 |
| 3,048,393 | 8/1962 | Furr et al. 271—36 X |
| 3,061,303 | 10/1962 | Glaser et al. 271—61 |

RICHARD E. AERGERTER, Primary Examiner